(12) United States Patent
Yoon et al.

(10) Patent No.: US 9,019,464 B2
(45) Date of Patent: Apr. 28, 2015

(54) LIQUID CRYSTAL DISPLAY DEVICE AND METHOD FOR REPAIRING THE SAME

(71) Applicant: LG Display Co., Ltd., Seoul (KR)

(72) Inventors: HyunMyoung Yoon, Gyeongsangbuk-Do (KR); IlMan Choi, Gyeongsangbuk-Do (KR); MoonSoo Kang, Daegu (KR); HwiJe Cho, Gyeongsangnam-Do (KR)

(73) Assignee: LG Display Co., Ltd., Seoul (KR)

( * ) Notice: Subject to any disclaimer, the term of this patent is extended or adjusted under 35 U.S.C. 154(b) by 187 days.

(21) Appl. No.: 13/725,700

(22) Filed: Dec. 21, 2012

(65) Prior Publication Data

US 2013/0215354 A1    Aug. 22, 2013

(30) Foreign Application Priority Data

Feb. 22, 2012 (KR) .................. 10-2012-0018189

(51) Int. Cl.
| | |
|---|---|
| *G02F 1/1333* | (2006.01) |
| *G02F 1/1343* | (2006.01) |
| *G02F 1/13* | (2006.01) |
| *G02F 1/1368* | (2006.01) |
| *G02F 1/1362* | (2006.01) |

(52) U.S. Cl.
CPC ............ *G02F 1/1309* (2013.01); *G02F 1/1368* (2013.01); *G02F 1/136286* (2013.01); *G02F 1/136227* (2013.01); *G02F 1/136259* (2013.01)

(58) Field of Classification Search
USPC ............................................. 349/54, 55, 192
See application file for complete search history.

(56) References Cited

U.S. PATENT DOCUMENTS

| | | | |
|---|---|---|---|
| 2008/0116501 A1* | 5/2008 | Lin et al. ....................... | 257/315 |
| 2012/0127389 A1* | 5/2012 | Nagami ......................... | 349/47 |

FOREIGN PATENT DOCUMENTS

| | | |
|---|---|---|
| KR | 10-2010-006460 A | 1/2010 |
| TW | 200521598 A | 7/2005 |
| TW | 200734775 A | 9/2007 |

* cited by examiner

*Primary Examiner* — Michael Caley
(74) *Attorney, Agent, or Firm* — Birch, Stewart, Kolasch & Birch, LLP

(57) ABSTRACT

A liquid crystal display device including a cut portion at a position not overlapping the gate electrode such the pixel electrode is floating and does not receive a voltage from the source electrode via the active layer and the drain electrode; a second insulating layer above the first insulating layer; a plurality of common electrodes on the second insulating layer; and a welded portion at a region where a corresponding common electrode overlaps the drain electrode. Further, the drain electrode and the pixel electrode are electrically connected to each other via a connection pattern formed in a contact hole such that the welded portion floats the pixel electrode.

14 Claims, 13 Drawing Sheets

LIQUID CRYSTAL DISPLAY DEVICE AND METHOD FOR REPAIRING THE SAME

CROSS-REFERENCE TO A RELATED APPLICATION

Pursuant to 35 U.S.C. §119(a), this application claims the benefit of earlier filing date and right of priority to Korean Application No. 10-2012-0018189, filed on Feb. 22, 2012, the contents of which is incorporated by reference herein in its entirety.

BACKGROUND OF THE INVENTION

1. Field of the Invention

The present invention relates to a liquid crystal display (LCD) device and a method for repairing the same, and more particularly, to an LCD device in which a hot pixel is repaired into a dead pixel, and a method for repairing the same.

2. Background of the Invention

Flat display devices including a Liquid Crystal Display (LCD) device, a Plasma Display Panel (PDP), an Electro Luminescent Display (ELD), a Vacuum Fluorescent Display (VFD), etc. have been proposed. Among such flat display devices, the LCD device is being most widely used due to its advantages such as an excellent picture quality, a light weight, a thin profile, and low power consumption. The LCD device is used in various electronic products such as a computer and a television.

In more detail, the LCD device includes first and second substrates facing each other, a switching device formed at the first substrate, an LC layer disposed between the first and second substrates, a pixel electrode, a common electrode, etc. The switching device selectively transmits a voltage from an external driving circuit to the pixel electrode so as to drive the LC layer. As the LC layer is driven by an electric field formed by the pixel electrode and the common electrode, an image can be displayed.

However, the LCD device has the following problems. That is, if source and drain electrodes of the switching device are not normally patterned when forming the switching device, the source and drain electrodes may not be separated from each other. Further, a thin film transistor (TFT) may not be normally driven due to conductive foreign materials remaining at an LC panel, resulting in a hot pixel or a dead pixel.

Also, when implementing a high grey (white state), a 'dead pixel' refers to a phenomenon that a region is viewed as a dark region due to light leakage. On the other hand, when implementing a low grey (black state), a 'hot pixel' refers to a phenomenon that a region is viewed as a bright region due to light leakage.

FIG. 1 is a schematic view of a related art LCD device. Referring to FIG. 1, pixels (P) include normal pixels (N) and a hot pixel (H). In a black state, the normal pixels (N) are implemented in a dark color, whereas the hot pixel (H) is implemented in a bright color.

Generally, a human's eyes more sensitively recognize a hot pixel (H) implemented in a dark state, than a dead pixel implemented in a bright state. Accordingly, whether an LC panel is good or bad is generally determined based on an inferior state of the hot pixel (H) than the dead pixel. In this instance, the hot pixel (H) is repaired by performing a rework process with respect to a corresponding pixel, or by converting the hot pixel into a dead pixel.

However, in the rework process, the switching device may not be normally driven due to foreign materials remaining thereon. Furthermore, if the first and second substrates are attached to each other when foreign materials remain on the switching device, a rework process cannot be performed.

Therefore, a method for converting a hot pixel into a dead pixel is primarily used. In particular, FIG. 2 is a view showing a repaired pixel in an LCD device in accordance with the related art. That is, FIG. 2 illustrates a Fringe Field Switching (FFS) type LCD device, in which a repair process has been performed in regions 'a' and 'b'.

In the region 'a', a repair process is performed so that part of a drain electrode 42 can be cut. Since the drain electrode 42 is provided with a voltage from a source electrode 41 by a channel of an active layer 30, the voltage is not applied to a pixel electrode 15 connected to the cut drain electrode 42. That is, the pixel electrode 15 is floating. However, a potential of the floating pixel electrode 15 is different from a common electrode 60. This causes a corresponding pixel to operate as a hot pixel. Accordingly, a repair process is performed with respect to the region 'b'.

In the region 'b', a repair process is performed so that the pixel electrode 15 and the common electrode 60 are electrically shorted to each other. FIG. 3 illustrates a section of a pixel repaired in the region 'b'. Referring to FIG. 3, the repair process in the region 'b' is performed by welding an upper part of the common electrode 60 so as to form a passage connected to the pixel electrode 15 from a lower part of the common electrode 60.

As the passage is formed, the pixel electrode 15 and the common electrode 60 come in contact with each other. As the pixel electrode 15 and the common electrode 60 are electrically connected to each other, there is no potential difference therebetween.

In addition, because the repaired pixel electrode 15 has no potential difference from the common electrode 60, a horizontal electric field is not formed. Accordingly, an aligned state of LC molecules corresponding to the repaired pixel is not changed. That is, the repaired pixel is observed as a dead pixel in a black state.

If the LCD device is immediately driven after the repair process, the repaired pixel is observed as a dead pixel. However, the repaired pixel may be observed as a hot pixel, as the passage for connecting the pixel electrode 15 and the common electrode 60 to each other is closed by a voltage or heat generated from the repaired pixel, after the LCD device is continuously driven.

Furthermore, the repair process has a difficulty in passing through a thick film including a passivation layer and a gate insulating film each disposed between the pixel electrode 15 and the common electrode 60. It is also difficult to perform a welding process with respect to the pixel electrode 15 and the common electrode 60 each formed of a thin film having a thickness of 300 Å~400 Å.

SUMMARY OF THE INVENTION

Accordingly, one aspect of the present invention is to provide a liquid crystal display (LCD) device capable of enhancing a repair rate by electrically contacting a pixel electrode and a common electrode with each other through a floating electrode.

To achieve these and other advantages and in accordance with the purpose of this specification, as embodied and broadly described herein, the present invention provides in one aspect a liquid crystal display device including a first substrate and a second substrate facing each other; a gate electrode and a pixel electrode formed on the first substrate; a first insulating layer covering the gate electrode and partially covering the pixel electrode; an active layer on the first insulating layer; a source electrode on the active layer; a drain electrode on the active layer and connected to the pixel electrode, the drain electrode being spaced from the source electrode and connected electrically to the pixel electrode through a contact hole, where the drain electrode includes a cut portion at a position not overlapping the gate electrode such the pixel electrode is floating and does not receive a voltage from the source electrode via the active layer and the drain electrode; a second insulating layer above the first insulating layer; a plurality of common electrodes on the second insulating layer; and a welded portion at a region where a corresponding common electrode overlaps the drain electrode. Further, the drain electrode and the pixel electrode are electrically connected to each other via a connection pattern formed in a contact hole such that the welded portion floats the pixel electrode. The present invention also provides a corresponding method of repairing a liquid crystal display device.

In another aspect, the present invention provides a liquid crystal display device including a first substrate and a second substrate facing each other; a gate line, a gate electrode and a pixel electrode on the first substrate; a first insulating layer covering the gate electrode and partially covering the pixel electrode; an active layer on the first insulating layer; a source electrode on the active layer; a drain electrode on the active layer, the drain electrode being spaced from the source electrode and connected electrically to the pixel electrode through a contact hole, where the drain electrode includes a cut portion at a position not overlapping the gate electrode such the pixel electrode is floating and does not receive a voltage from the source electrode via the active layer and the drain electrode; a second insulating layer above the first insulating layer; a plurality of common electrodes on the second insulating layer; a common electrode connection line extending from a corresponding common electrode and overlapping another region of the gate line, where the gate line include first and second cut portions; and a welded portion at a position between the first and second cut portions and connecting the drain electrode to the gate line. Further, the common electrode connection line is disposed on top of the second insulating layer and extends through the second insulating layer to the gate line at another position between the first and second cut portions of the gate line. The present invention also provides a corresponding method of repairing a liquid crystal display device.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a liquid crystal display (LCD) device and a method for repairing the same according to embodiments of the present invention will be explained in more detail with reference to the attached drawings. A singular expression may include a plural concept unless there is a contextually distinctive difference therebetween. The components may be illustrated in drawings in an enlarged or contracted manner for convenience. Even though terms of 'first', 'second', etc. are used to explain various components, the components are not limited to the terms. Because the terms are used only to distinguish one component from another component, the components are not limited by the terms.

Figure 1:
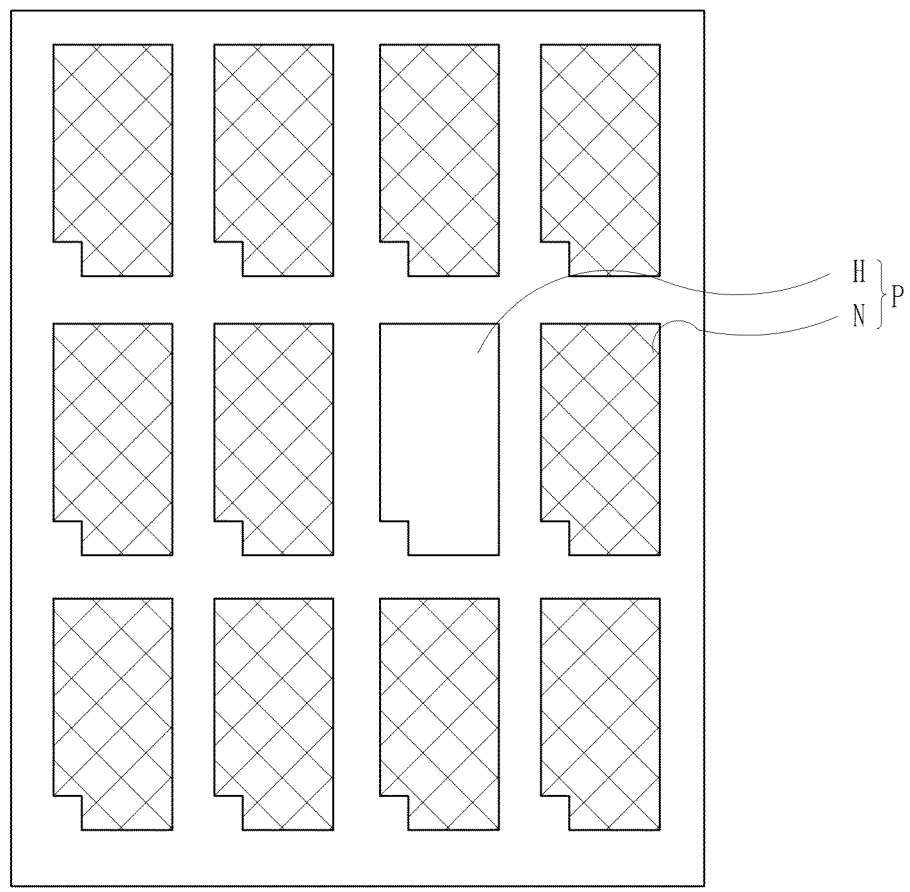
FIG. 1 is a schematic view of a related art liquid crystal display (LCD) device.
Figure 2:
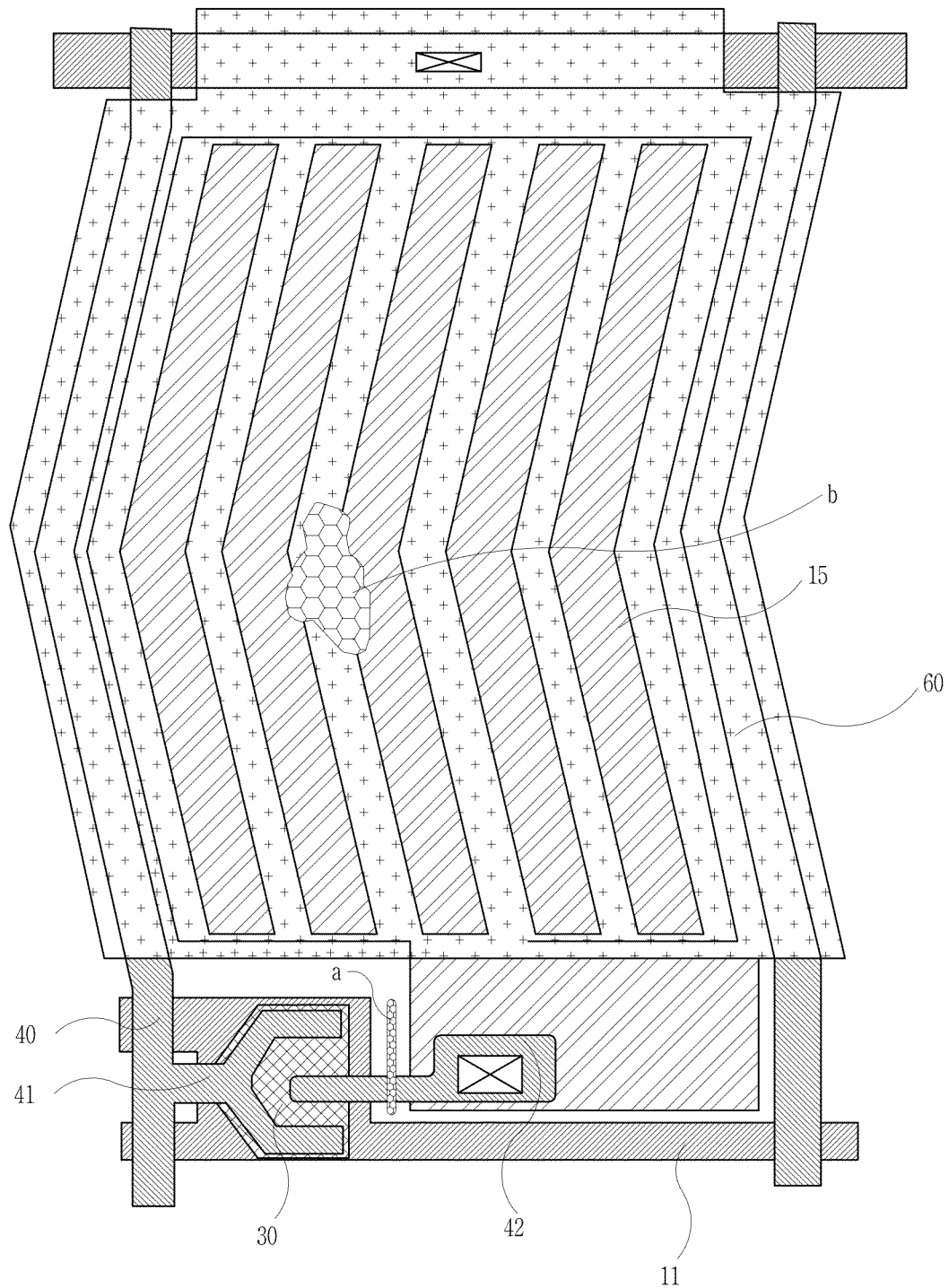
FIG. 2 is a view showing a repaired pixel of a related art LCD device.
Figure 3:
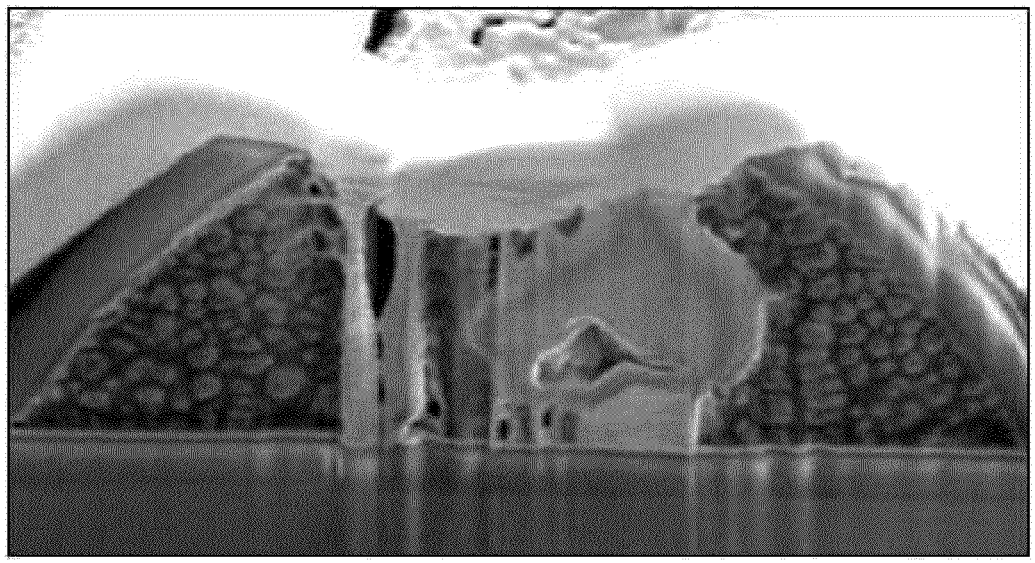
FIG. 3 is a sectional view showing a region 'b' in FIG. 2.
Figure 4A:
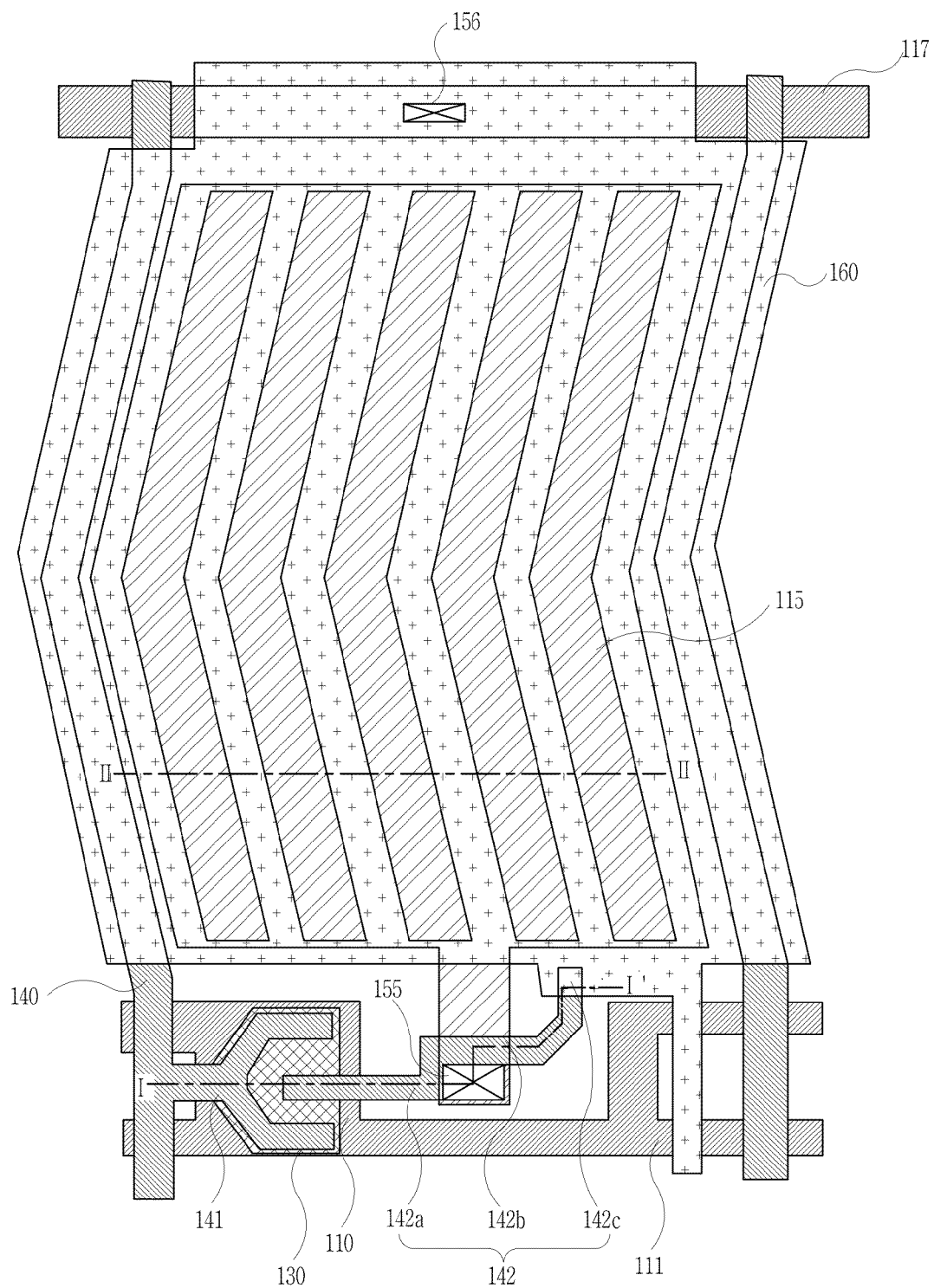
FIG. 4A is a planar view of a unit pixel of an LCD device according to a first embodiment of the present invention.
Figure 4B:
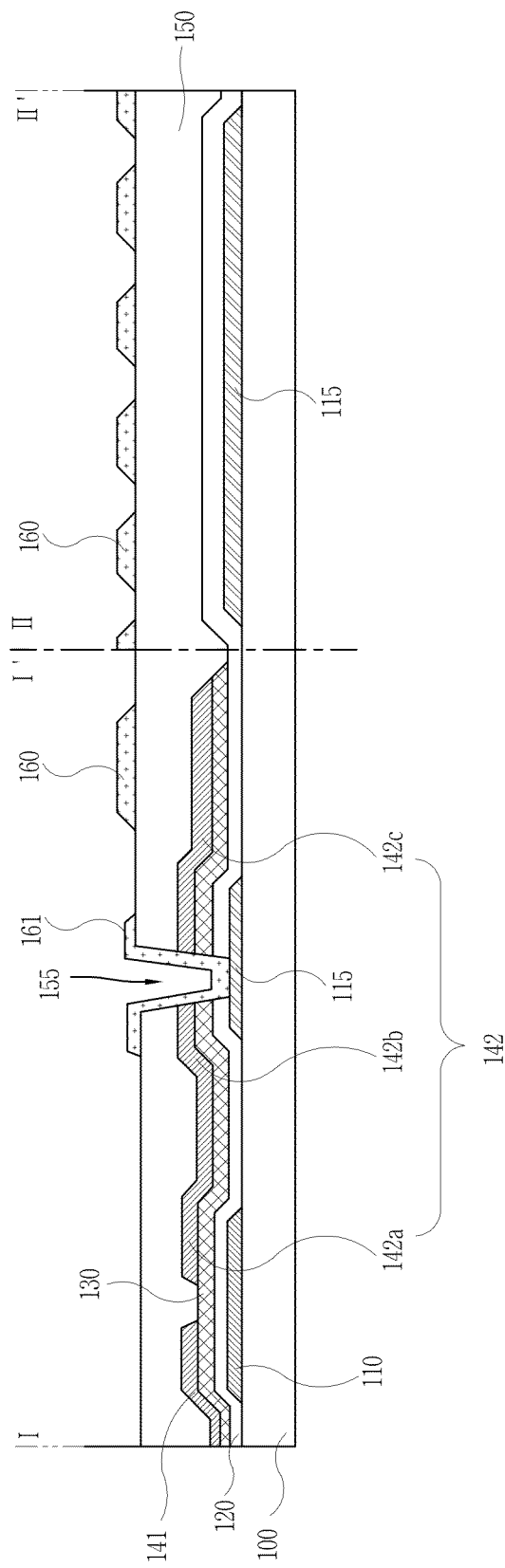
FIG. 4B is a sectional view taken along line I-I' and II-II' in FIG. 4A.

FIG. 4A is a planar view of a unit pixel of an LCD device according to a first embodiment of the present invention, and FIG. 4B is a sectional view taken along line I-I' and II-II' in FIG. 4A. The LCD device according to the first embodiment of the present invention includes an LC panel, a backlight unit and a driving circuit unit.

The LC panel includes a first substrate, a second substrate facing the first substrate and an LC layer. Only a first substrate 100 is shown in FIG. 4B Hereinafter, the first substrate will be explained in more detail.

Referring to FIGS. 4A and 4B, the first substrate 100 includes a gate line 111, a data line 140, a gate pad, a data pad, and a plurality of pixels. Each unit pixel includes a switching device, a pixel electrode 115 and a common electrode 160. Further, the data line 140 and the gate line 111 cross each other on the first substrate 100, which define a plurality of pixels in a matrix shape. The data line 140 may be formed in an 'S' shape having a predetermined angle.

In addition, the gate pad transmits a gate driving voltage received from an external circuit to the gate line 111. Further, the data pad transmits a data driving voltage received from an external circuit to the data line 140. The switching device serving as a thin film transistor (TFT) includes a gate electrode 110, an active layer 130, and source/drain electrodes 141 and 142.

Further, the gate electrode 110 extending from the gate line 111 is formed on the first substrate 100. For smooth transfer of a gate voltage and for prevention of damage due to an incident light from a backlight unit, the gate electrode 110 is preferably formed to have an area larger than that of the active layer 130. The active layer 130 is formed at a region overlapping the gate electrode 110 where a first insulating layer 120 is disposed therebetween.

The active layer 130 forms a channel region along which charges move and may include amorphous silicone or an oxide semiconductor. If the active layer 130 is formed of amorphous silicone, an ohmic contact layer can be formed on the active layer 130 for smooth electrical contact between the active layer 130 and the source/drain electrodes 141 and 142. On the other hand, if the active layer 130 is formed of an oxide semiconductor, an etch stopper can be formed on the active layer 130 so that damage of the channel region of the active layer 130 due to etching can be prevented.

Then, the source/drain electrodes 141 and 142 are formed to overlap the active layer 130. Referring to FIG. 4A, the source electrode 141 extends from one region of the data line 140 towards the gate line 111 in a 'U' shape. In addition, the drain electrode 142 is inserted into the 'U'-shaped source electrode 141. This configuration enhances a channel characteristic of the active layer 130 by controlling a channel width (W)/a channel length (L). However, the source/drain electrodes 141 and 142 are not limited to have such shape, and can have various shapes.

Also, the drain electrode 142 includes a first drain electrode portion 142a, a second drain electrode portion 142b, and a third drain electrode portion 142c. The first drain electrode portion 142a is adjacent to the source electrode 141, and partially overlaps a channel region so as to receive from the source electrode 141a data voltage transferred through the data line 140.

The second drain electrode portion 142b extends from the first drain electrode portion 142a and is electrically connected through a first contact hole 155 to the pixel electrode 115 formed below the second drain electrode portion 142b. In addition, the third drain electrode portion 142c extends from the second drain electrode portion 142b in one direction, and overlaps the common electrode 160. The third drain electrode portion 142c may also be formed to have a predetermined curvature.

Referring to FIG. 4B, the active layer 130 is preferably formed to entirely overlap the drain electrode 142. This results from the drain electrode 142 and the active layer 130 being formed using the same mask. However, the first embodiment of the present invention is not limited to this. That is, the active layer 130 may be formed to partially overlap the drain electrode 142.

Referring to FIG. 4A, the pixel electrode 115 is formed in a single pattern so as to correspond to a transmissive region of a unit pixel. Referring to FIG. 4B, the pixel electrode 115 is formed at the same layer as the gate electrode 110 on the first substrate 100. The pixel electrode 115 is also electrically connected to the drain electrode 142 via a connection pattern 161 of the first contact hole 155, and receives a data voltage from the drain electrode 142.

Further, the first contact hole 155 is formed through the first insulating layer 120, the active layer 130, the drain electrode 142 and a second insulating layer 150. The connection pattern 161 is formed in the first contact hole 155. Accordingly, the connection pattern 161 contacts the second drain electrode portion 142b on an inner side surface of the first contact hole 155, and contacts the pixel electrode 115 on a lower surface of the first contact hole 155. Referring to FIG. 4A, the first contact hole 155 is formed to partially overlap the second drain electrode portion 142b.

Referring to FIG. 4A, the common electrode 160 is formed at a region overlapping the pixel electrode 115 and includes a plurality of slits, which forms a fringe electric field together with the pixel electrode 115. Referring to FIG. 4B, the common electrode 160 is formed on the second insulating layer 150. In the LCD device according to the first embodiment of the present invention, the first insulating layer 120 and the second insulating layer 150 are included between the pixel electrode 115 and the common electrode 160. Under this configuration, the distance between the pixel electrode 115 and the common electrode 160 is maximized, which minimizes an influence by a parasitic capacitor occurring therebetween.

Further, the common electrode 160 receives a common voltage by being electrically connected to a common voltage line 117 through a second contact hole 156. Referring to FIG. 4A, a common electrode connection line downward extending along with the common electrode 160 extending right and left are connected to the common electrode 160 of a neighboring pixel. Under this configuration, the common electrode 160 of each pixel can be smoothly supplied with a common voltage.

In addition, a region of the common electrode 160 near the common electrode connection line is formed to overlap the third drain electrode portion 142c. The reason is to facilitate an electrical contact between the common electrode 160 and the third drain electrode 142, when welding during a repair process.

The common electrode 160 may also be formed by using the same mask as the connection pattern 161. Further, each of the common electrode 160, the connection pattern 161 and the pixel electrode 115 may include a transparent conductive material such as Indium Tin Oxide (ITO) or Indium Zinc Oxide (IZO).

As aforementioned, if foreign materials are introduced to the first substrate 100, or if the source/drain electrodes 141 and 142 of the TFT have an inferior pattern, a corresponding pixel may operate as a hot pixel. To solve such a problem, a method for repairing an LCD device according to the first embodiment will be explained in more detail.

Figure 5A:
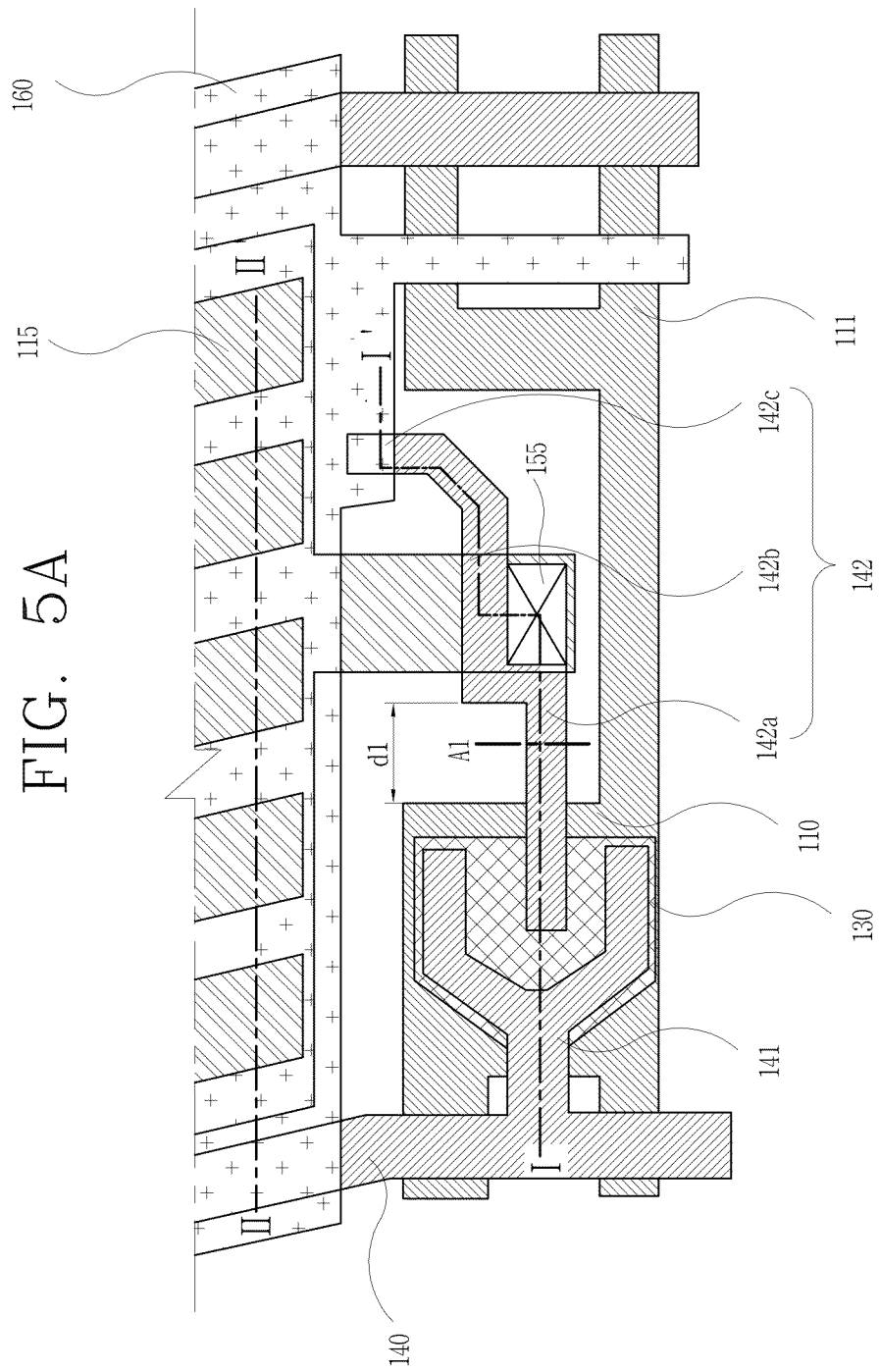
FIGS. 5A and 6A are planar views showing a repair process in an LCD device according to the first embodiment of the present invention.
Figure 5B:
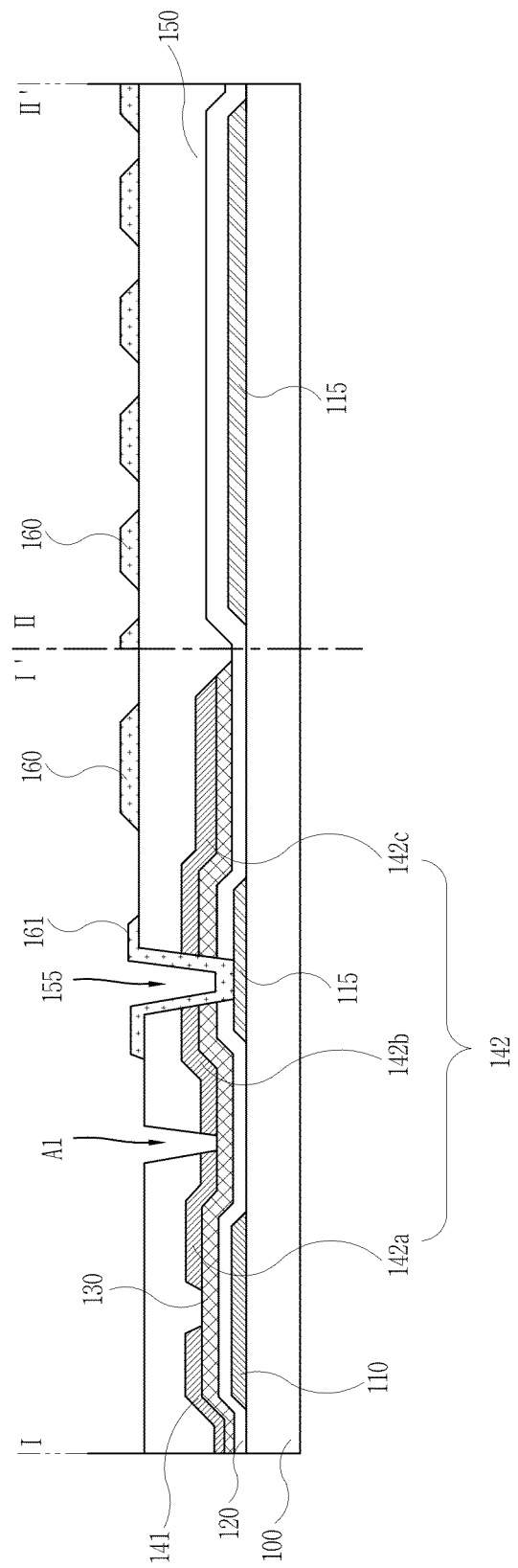
FIGS. 5B and 6B are sectional views taken along line I-I' and II-II' in FIGS. 5A and 6A.
Figure 6A:
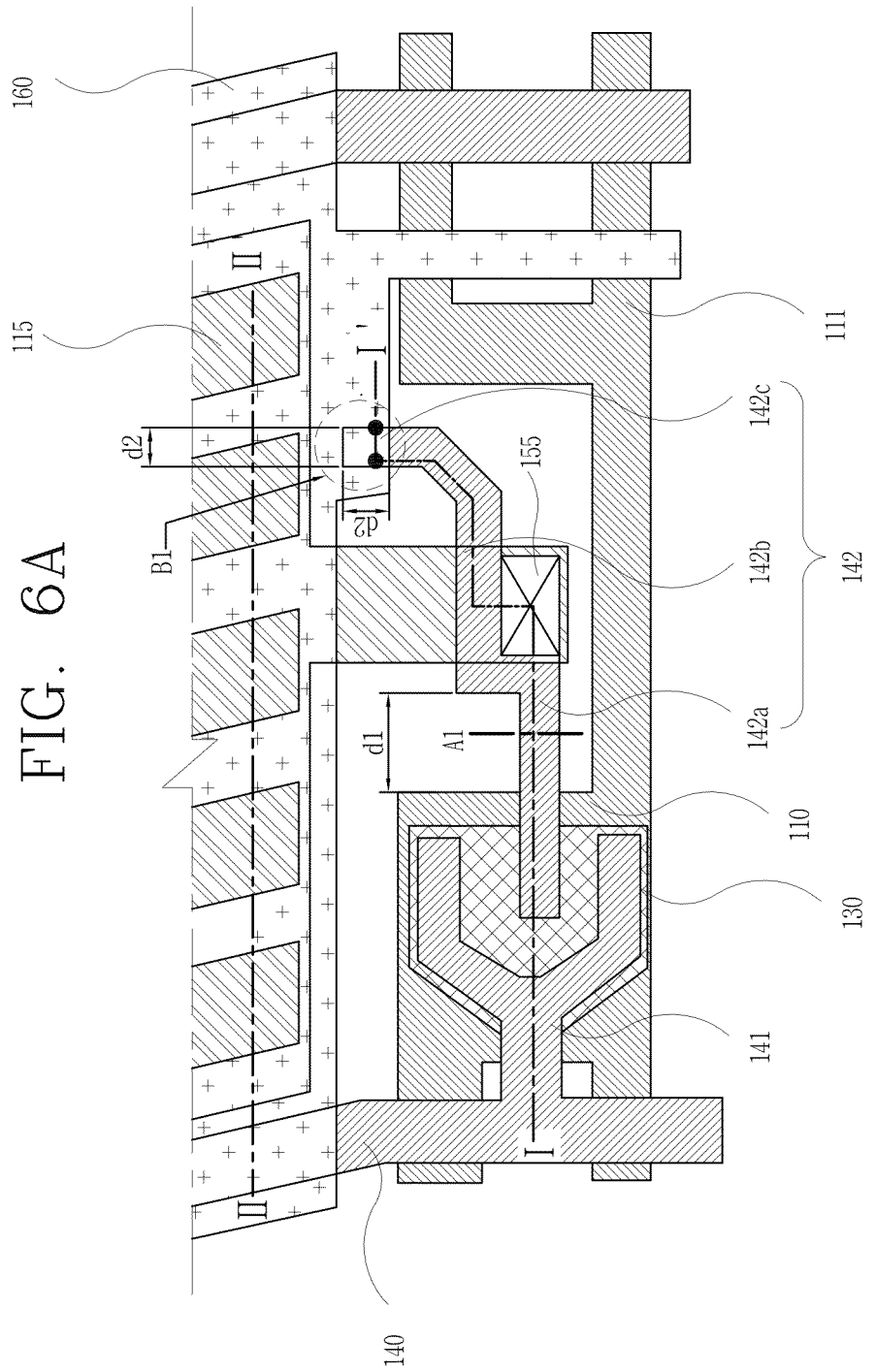
Figure 6B:
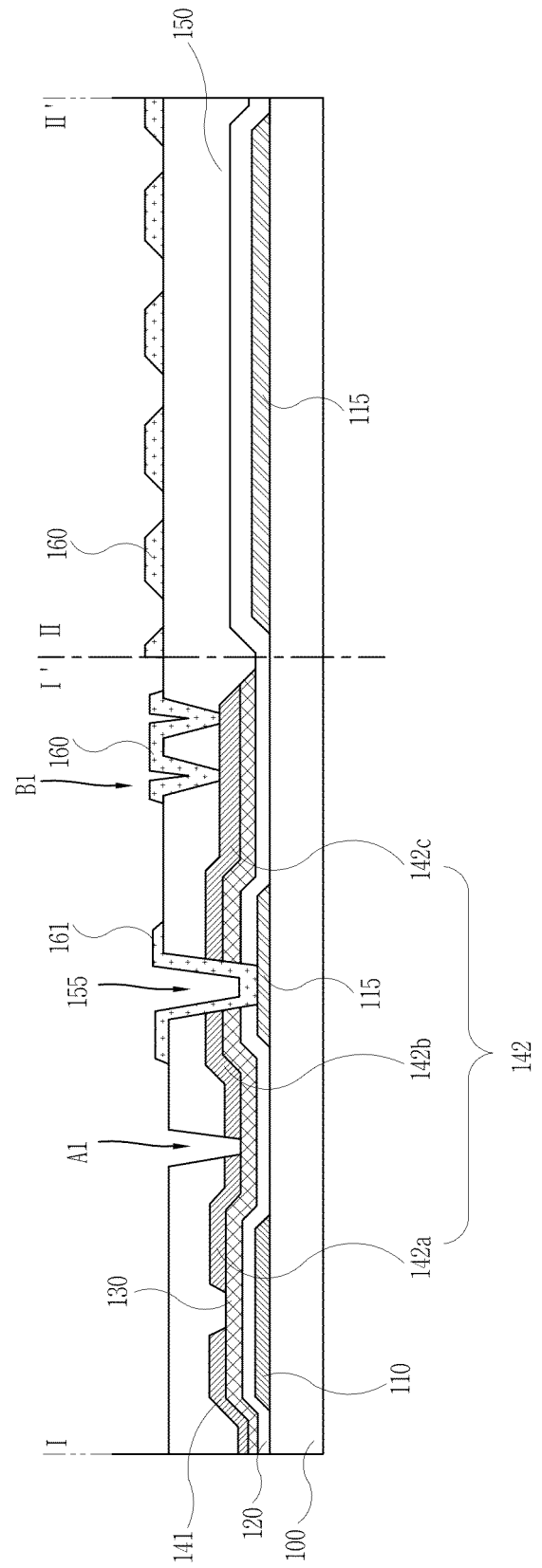

In particular, FIGS. 5A and 6A are planar views showing a repair process in an LCD device according to the first embodiment of the present invention, and FIGS. 5B and 6B are sectional views taken along line I-I' and II-II' in FIGS. 5A and 6A. As shown in FIG. 5A, the first drain electrode portion 142a formed at a hot pixel is cut so as to repair the hot pixel. The cutting may be performed by various cutting tools. Preferably, a laser is used. A laser spot is preferably in the range of 3.5 μm~4.5 μm.

The cutting position is a region 'A1', which indicates where the first drain electrode portion 142a does not overlap the gate electrode 110. When cutting the drain electrode portion 142a by a laser at an overlapping region with the gate electrode 110, if the cutting is excessively performed up to the gate electrode 110 from the drain electrode 142, the drain electrode 142 melted by the laser comes in contact with the gate electrode 110.

This causes electrical shorting between the drain electrode 142 and the gate electrode 110. Therefore, the region 'A1' is preferably a region of the first drain electrode portion 142a not overlapping the gate electrode 110. A width (d1) of the region 'A1' may be at least 7.5 μm for prevention of electrical interference between the gate electrode 110 and the drain electrode 142.

In addition, the cutting direction may be a direction perpendicular to the first drain electrode portion 142a. However, the present invention is not limited to this. That is, the cutting direction may be any direction where the first drain electrode portion 142a is electrically disconnected from the gate electrode 110.

As shown in FIG. 5B, the cutting depth may have any value so only the first drain electrode portion 142a is cut. For cutting the first drain electrode portion 142a, the second insulating layer 150 is firstly cut. The second insulating layer 150 preferably has a thickness of 5000 Å~6000 Å. When cutting the first drain electrode portion 142a, the second drain electrode portion 142b and the pixel electrode 115 are in a floating state, respectively. That is, the floating state indicates a voltage is not applied to the electrode due to an insulated state.

Here, the pixel electrode 115 is floating because the first drain electrode portion 142a is electrically connected to the second drain electrode portion 142b, the third drain electrode portion 142c, and the pixel electrode 115. A passage through which a data voltage from the source electrode 141 is transferred to the second drain electrode portion 142b, the third drain electrode portion 142c and the pixel electrode 115, disappears by the cutting process. Accordingly, the pixel electrode 115, the second drain electrode portion 142b and the third drain electrode portion 142c are in a floating state, respectively.

Then, a welding process is performed at a region 'B' where the third drain electrode portion 142c and the common electrode 160 overlap each other as shown in FIGS. 6A and 6B. The welding may be performed by a laser, and a laser spot is preferably in the range of 3.5 μm~4.5 μm. In addition, the third drain electrode portion 142c and the common electrode 160 are welded to each other in the form of points. However, the third drain electrode portion 142c and the common electrode 160 may be welded to each other in the form of lines or planes.

For point welding the third drain electrode portion 142c and the common electrode 160, the welding can be performed on at least one spot. In FIGS. 6A and 6B, the welding is performed on two spots. In addition, the region 'B1' preferably has an area larger than a width of the laser spot. The area of the region 'B1' can be differently designed according to an area of a welding spot. That is, the area of the region 'B1' can be determined considering the equipment used such as a laser unit, a processing margin for aligning the first substrate 100, etc.

For instance, referring to FIG. 6A, the welding is performed in the form of points at two spots. Because the laser spot has a width of 3.5 μm~4.5 μm, the welding spot preferably has a width of 3.5 μm~4.5 μm. Each horizontal width (d1) and vertical width (d2) of the region 'B1' is also preferably designed to be 5 μm or more when considering a processing margin.

Next, the section of the region 'B1' where the welding is performed will be explained. The common electrode 160 is electrically connected to the third drain electrode portion 142c through the second insulating layer 150. Once a laser is irradiated onto the second insulating layer 150, a passage of a predetermined width is formed. Further, the common electrode 160 melted by the laser flows on the third drain electrode portion 142c through the passage, thereby contacting the third drain electrode portion 142c.

As the third drain electrode portion 142c and the common electrode 160 are electrically connected to each other, they have the same potential. In addition, the third drain electrode portion 142c is connected to the pixel electrode 115 through the second drain electrode portion 142b, and the pixel electrode 115 is in a floating state. Because the pixel electrode 115 and the common electrode 160 are electrically connected to each other through the floating second and third drain electrode portions 142b and 142c, the pixel electrode 115 and the common electrode 160 have the same potential.

In order to drive an LC layer, an electric field for changing an alignment direction of LC molecules is generated by a potential difference between the pixel electrode 115 and the common electrode 160. In the first embodiment, the LC layer is not driven because there is no potential difference between the common electrode 160 and the pixel electrode 115. Accordingly, a repaired unit pixel does not allow light to pass therethrough in a black state. That is, a hot pixel is converted into a dead pixel.

Further, in the first embodiment, the drain electrode 142 preferably has a thickness of 2500 Å~3000 Å, whereas the pixel electrode 115 preferably has a thickness of 300 Å~400 Å. The first insulating layer 120 preferably has a thickness of about 4000 Å, and the second insulating layer 150 preferably has a thickness of 5000 Å~6000 Å. In the related art, the pixel electrode 115 having a small thickness and the common electrode 160 are welded to each other through the first insulating layer 120 and the second insulating layer 150 having a total depth of about 10,000 Å. Furthermore, even if the repair process has been successfully performed, a repaired pixel may change into an inferior pixel after a continuous driving of the LCD device, due to the related art welding process.

However, in the present invention, welding is performed with respect to the thick drain electrode 142 only through the second insulating layer 150 having a thickness of 5000 Å~6000 Å without through the first insulating layer 120. Accordingly, a welding process is more smoothly performed in the present invention than in the related art. That is, because the drain electrode 142 and the common electrode 160 completely come in electrical contact with each other, a repair process can be successfully performed. Furthermore, since a repaired pixel does not change into an inferior pixel after a continuous driving of the LCD device, the reliability of the product is enhanced.

Figure 7A:
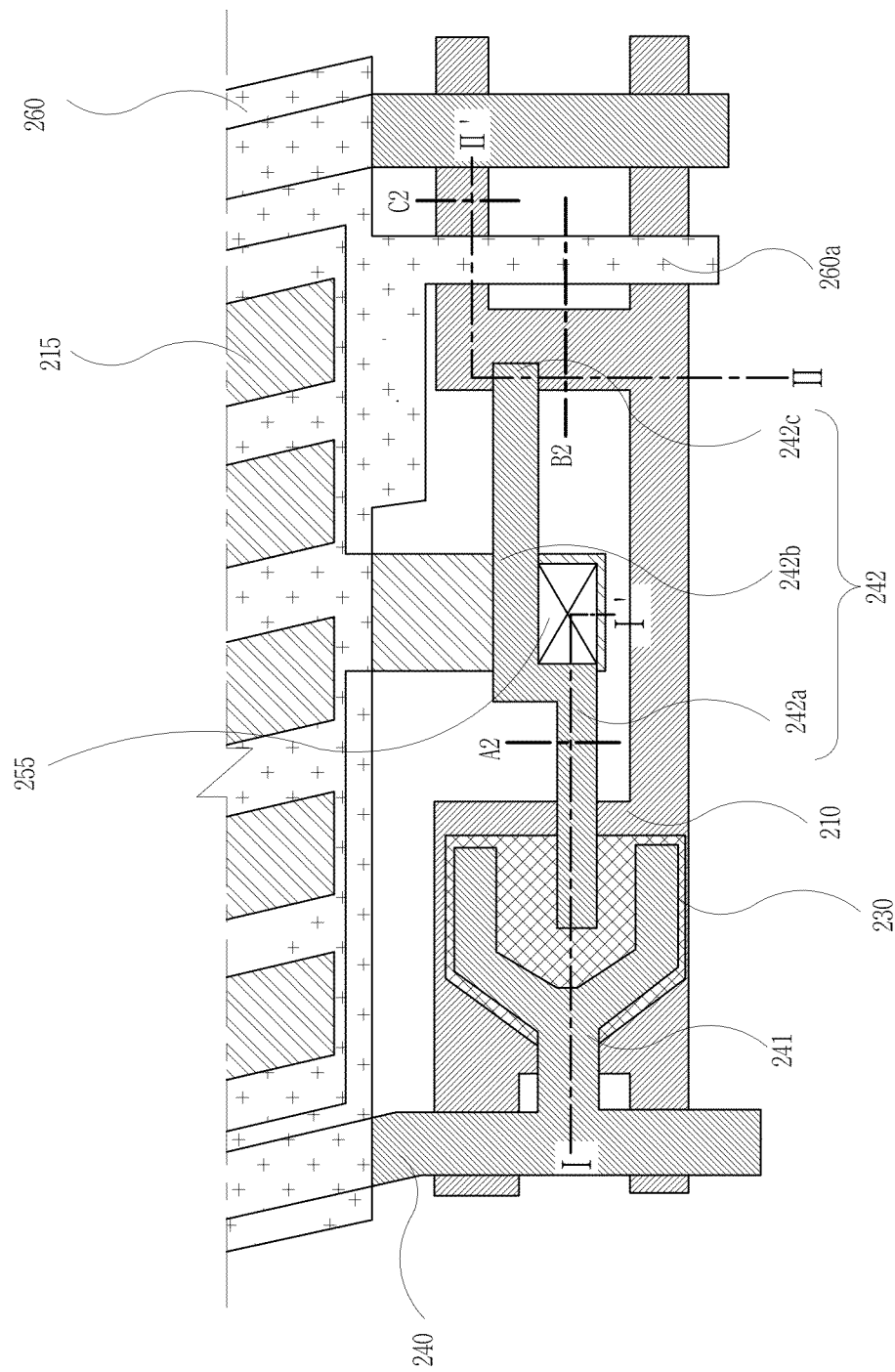
FIGS. 7A and 8A are planar views showing a repair process in an LCD device according to a second embodiment of the present invention.
Figure 7B:
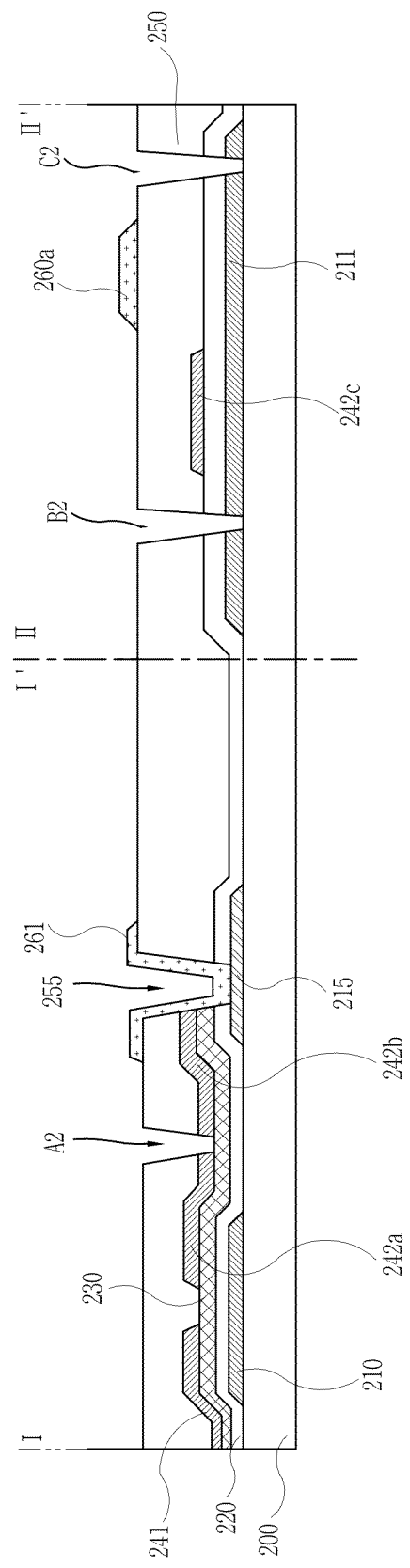
FIGS. 7B and 8B are sectional views taken along line I-I' and II-II' in FIGS. 7A and 8A.
Figure 8A:
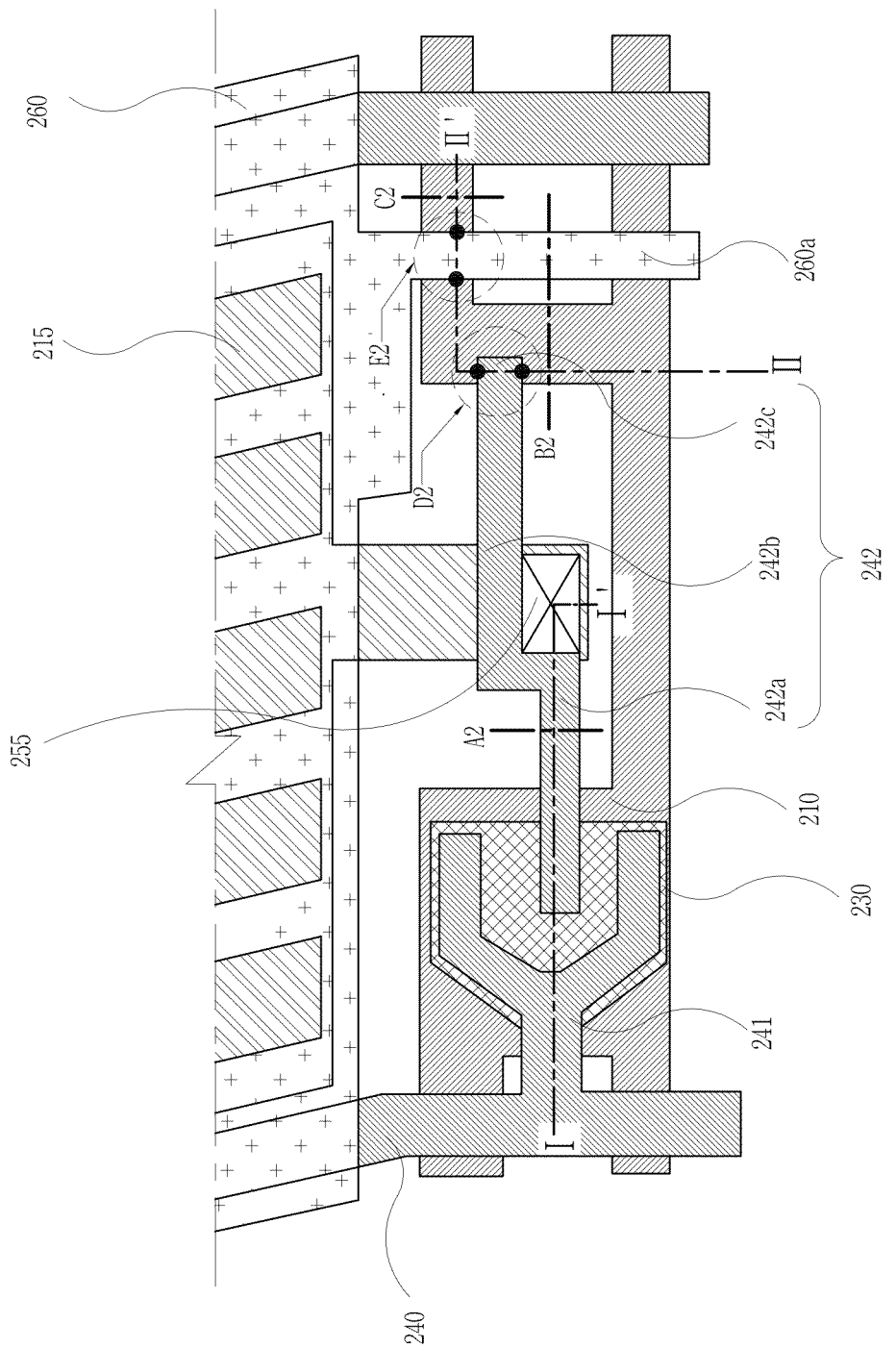
Figure 8B:
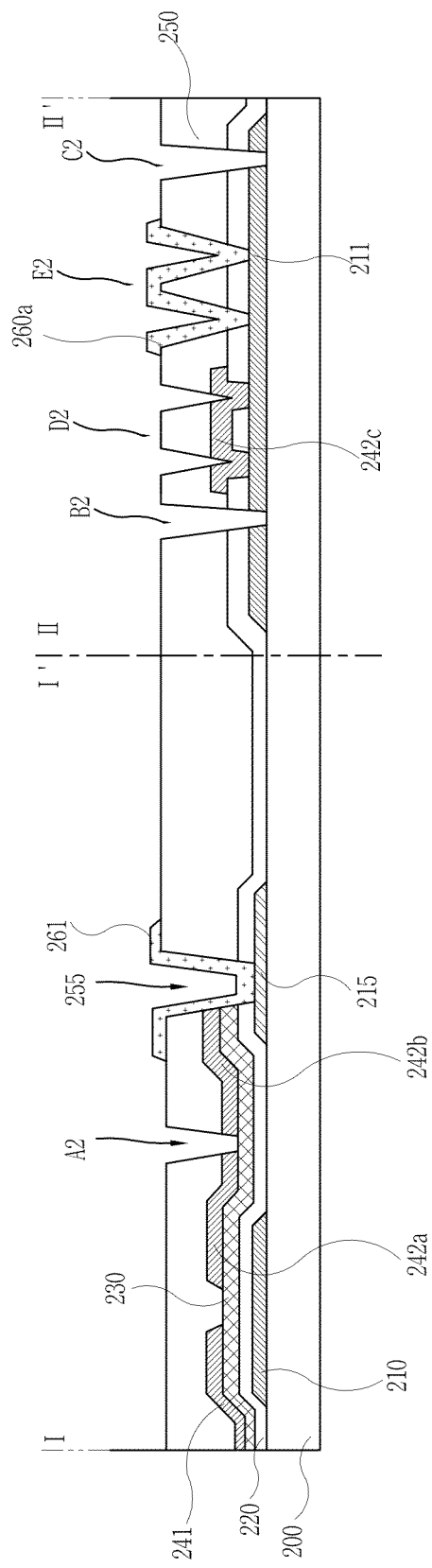

Hereinafter, a method for repairing an LCD device according to a second embodiment of the present invention will be explained in more detail. In particular, FIGS. 7A and 8A are planar views showing a repair process in an LCD device according to the second embodiment of the present invention, and FIGS. 7B and 8B are sectional views taken along line I-I' and II-II' in FIGS. 7A and 8A.

The LCD device according to the second embodiment has a similar configuration as the LCD device according to the first embodiment, except for the shape of a third drain electrode portion 242c. Referring to FIGS. 7A and 7B, the third drain electrode portion 242c is formed to overlap a gate line 211. Further, the gate line 211 extends to a direction perpendicular to a gate line forming direction, rather than another gate line region 211.

Unlike in the first embodiment, the third drain electrode portion 242c is formed to have no curved portion, and extends from the second drain electrode portion 242b towards the same direction as the gate line forming direction. Referring to FIG. 7B, the third drain electrode 242c and the gate line 211 are arranged to overlap each other with the first insulating layer 220 disposed therebetween.

In the LCD device according to the second embodiment, a pixel electrode 215 and a common electrode connection line 260a are connected to each other to have the same potential by the gate line 211 as well as the drain electrode 242. A method for repairing an LCD device according to the second embodiment will now be explained. Referring to FIGS. 7A and 7B, the method for repairing an LCD device according to the second embodiment is performed by cutting the drain electrode 242 formed at a hot pixel. The cutting process can be performed by a laser.

Further, the drain electrode 242 includes a first drain electrode portion 242a, a second drain electrode portion 242b, and a third drain electrode portion 242c. When cutting the first drain electrode portion 242a, each of the second drain electrode portion 242b and the third drain electrode portion 242c connected to the first drain electrode portion 242a are in a floating state. Also, because the second drain electrode portion 242b is connected to the pixel electrode 215, the pixel electrode 215 is also in a floating state.

An active layer 230, contact hole 255 and connection pattern 261 are also shown in this second embodiment. In addition, the cutting region is a region 'A2', which is a region where the first drain electrode portion 242a has been formed. The region 'A2' may also be a region not overlapping a gate electrode 210, among regions where the first drain electrode portion 242a has been formed.

Then, the gate line 211 is cut at regions 'B2' and 'C2', thereby being in a floating state. Referring to FIG. 7A, the floating gate line 211 indicates part of the gate line 211 formed at an overlapping region between the third drain electrode portion 242c and the common electrode connection line 260a. Referring to FIG. 7B, the first insulating layer 220 is disposed between the floating gate line 211 and the third drain electrode portion 242c. In addition, the first insulating layer 220 and the second insulating layer 250 are disposed between the floating gate line 211 and the common electrode connection line 260a.

Further, in the region 'B2', only the gate line 211 is cut. Alternatively, both of the common electrode connection line 260a and the gate line 211 may be cut as shown in FIG. 7A. Even if the common electrode connection line 260a is cut, a common voltage can be applied to the common electrode 260 through another region. This generally does not causes significant problems in repairing the LCD device.

Also, in the region 'C2', only a single gate line 211 for forming the floating gate line 211 is preferably cut. In addition, the regions 'A2, B2 and C2' may be cut by a laser as in the first embodiment. In the region 'A2', the second insulating layer 250 and the drain electrode 242 are cut, and in the regions 'B2 and C2', the second insulating layer 250 and the gate line 211 are cut.

Then, as shown in FIGS. 8A and 8B, the floating third drain electrode portion 242c and the floating gate line 211 are welded to each other. The common electrode connection line 260a and the floating gate line 211 may also be welded to each other.

Further, when welding the floating third drain electrode portion 242c and the floating gate line 211 to each other, a single floating electrode is formed. Then, the common electrode connection line 260a is welded to the floating electrode. Accordingly, the floating electrode serves as a medium for electrically connecting the common electrode connection line 260a and the pixel electrode 215 to each other.

Referring to FIG. 8B, which shows a sectional surface of a substrate, the second drain electrode 242 is electrically connected to the pixel electrode 215 at a region of I~I'. At a region of II~II', the third drain electrode portion 242c and the common electrode connection line 260a are electrically connected to each other through the floating gate line 211. Because the second drain electrode portion 242b and the third drain electrode portion 242c are electrically connected to each other, the pixel electrode 215 and the common electrode 260 are electrically connected to each other.

In addition, the welding is performed at a region 'D2' where the third drain electrode portion 242c and the floating gate line 211 overlap each other, and at a region 'E2' where the common electrode connection line 260a and the floating gate line 211 overlap each other. The region 'E2' is formed as the common electrode connection line 260a crosses the gate line.

As discussed above, the welding can be performed by a laser in the form of points, or lines, or planes. When welding in the form of points, the welding may be performed on at least one spot. When a laser spot has a width of 3.5 μm~4.5 μm and the welding is performed on two spots, each of a horizontal width and a vertical width at the regions 'D2' and 'E2' is preferably 5 μm or greater.

As aforementioned, in the method for repairing an LCD device according to the second embodiment, the third drain electrode portion 242c and the floating gate line 211 are implemented as a floating electrode, thereby serving as a medium for electrically connecting the pixel electrode 215 and the common electrode connection line 260a to each other. As a result, the common electrode connection line 260a and the pixel electrode 215 at a hot pixel have the same potential. Accordingly, the hot pixel is converted into a dead pixel.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display device, comprising:
    a first substrate and a second substrate facing each other;
    a gate electrode and a pixel electrode formed on the first substrate;
    a first insulating layer covering the gate electrode and partially covering the pixel electrode;
    an active layer on the first insulating layer;
    a source electrode on the active layer;
    a drain electrode on the active layer and connected to the pixel electrode, the drain electrode being spaced from the source electrode and connected electrically to the pixel electrode through a contact hole, wherein the drain electrode includes a cut portion at a position not overlapping the gate electrode such the pixel electrode is floating and does not receive a voltage from the source electrode via the active layer and the drain electrode;
    a second insulating layer above the first insulating layer;
    a plurality of common electrodes on the second insulating layer; and
    a welded portion at a region where a corresponding common electrode overlaps the drain electrode,
    wherein the drain electrode and the pixel electrode are electrically connected to each other via a connection pattern formed in a contact hole such that the welded portion floats the pixel electrode.

2. The liquid crystal display device of claim 1, wherein the welded portion shorts the drain electrode and the corresponding common electrode so that the pixel electrode and the corresponding common electrode have a same potential.

3. The liquid crystal display device of claim 1, wherein the welded portion includes at least one spot weld.

4. The liquid crystal display device of claim 1, wherein the drain electrode has a thickness of 2500 Å~3000 Å, and the second insulating layer formed between the drain electrode and the common electrode has a thickness of 5000 Å~6000 Å.

5. The liquid crystal display device of claim 1, wherein the contact hole passes through the first insulating layer, the active layer, the drain electrode and the second insulating layer, and wherein the connection pattern and the common electrode include Indium Tin Oxide (ITO).

6. The liquid crystal display device of claim 5, wherein the drain electrode and the contact hole partially overlap each other.

7. The liquid crystal display device of claim 1, further comprising:

an etch stopper formed on a channel region of the active layer and below the source and drain electrodes.

8. A method of repairing a liquid crystal display device, the method comprising:

providing a thin film array substrate including a first substrate and a second substrate facing each other; a gate electrode and a pixel electrode formed on the first substrate; a first insulating layer covering the gate electrode and partially covering the pixel electrode; an active layer on the first insulating layer; a source electrode on the active layer; a drain electrode on the active layer and connected to the pixel electrode; a second insulating layer above the first insulating layer; and a plurality of common electrodes on the second insulating layer, wherein the drain electrode is spaced from the source electrode and connected electrically to the pixel electrode through a contact hole;

cutting a cut portion through the drain electrode at a position not overlapping the gate electrode such the pixel electrode is floating and does not receive a voltage from the source electrode via the active layer and the drain electrode; and welding a welded portion at a region where a corresponding common electrode overlaps the drain electrode, wherein the drain electrode and the pixel electrode are electrically connected to each other via a connection pattern formed in a contact hole such that the welded portion floats the pixel electrode.

9. The method of claim 8, wherein the welded portion shorts the drain electrode and the corresponding common electrode so that the pixel electrode and the corresponding common electrode have a same potential.

10. The method of claim 8, wherein the welded portion includes at least one spot weld.

11. The method of claim 8, wherein the drain electrode has a thickness of 2500 Å~3000 Å, and the second insulating layer formed between the drain electrode and the common electrode has a thickness of 5000 Å~6000 Å.

12. The method of claim 8, wherein the contact hole passes through the first insulating layer, the active layer, the drain electrode and the second insulating layer, and wherein the connection pattern and the common electrode include Indium Tin Oxide (ITO).

13. The method of claim 12, wherein the drain electrode and the contact hole partially overlap each other.

14. The method of claim 8, further comprising:

forming an etch stopper on a channel region of the active layer and below the source and drain electrodes.

* * * * *